Dec. 31, 1957  B. E. RICHERT  2,817,905
SEISMIC DATA PLOTTER
Filed Aug. 5, 1954  4 Sheets-Sheet 1

INVENTOR.
BERNHARD E. RICHERT
BY
ATTORNEYS

Dec. 31, 1957

B. E. RICHERT 2,817,905

SEISMIC DATA PLOTTER

Filed Aug. 5, 1954

INVENTOR.
BERNHARD E. RICHERT
BY

ATTORNEYS

Dec. 31, 1957     B. E. RICHERT     2,817,905
SEISMIC DATA PLOTTER

Filed Aug. 5, 1954     4 Sheets-Sheet 3

INVENTOR.
BERNHARD E. RICHERT
BY
ATTORNEYS

Dec. 31, 1957   B. E. RICHERT   2,817,905
SEISMIC DATA PLOTTER

Filed Aug. 5, 1954   4 Sheets-Sheet 4

INVENTOR.
BERNHARD E. RICHERT
BY
ATTORNEYS

United States Patent Office 2,817,905
Patented Dec. 31, 1957

2,817,905

SEISMIC DATA PLOTTER

Bernhard E. Richert, Beaumont, Tex., assignor to Sun Oil Company, Philadelphia, Pa., a corporation of New Jersey Application August 5, 1954, Serial No. 448,099

9 Claims. (Cl. 33—76)

In seismic exploration for oil and other minerals the utility of the seismic records obtained depends, to a considerable degree, upon the proper interpretation of seismic wave velocity data obtained for the portion of the earth undergoing exploration.

If seismic wave velocity through the earth changes with depth, the ray paths of the seismic waves, other than the path extending in the direction of maximum velocity change, are no longer straight lines. If the wave velocity changes uniformly with depth, the ray paths will be curved and the direction of travel of each ray path at each point along the ray path will be at right angles to the wave front at that point. In this case, the only ray path that is a straight line will be one in the direction of maximum velocity change.

When the change in the wave velocity causes only slight curving of the ray paths, the ray paths may be assumed to be straight lines in many instances without causing any sensible error in the interpretation of seismic data. This is particularly true if only horizontal reflecting interfaces are being mapped. When, however, the dip in the reflecting interfaces becomes appreciable, approaching 10° or more, the error introduced in the interpretation of the seismic data due to neglecting the curving of the ray paths caused by variations in seismic wave velocities may become considerable. It is then necessary to take into account the curving of the ray paths in order to find the correct dip, horizontal displacement and depth of a reflecting interface. In other words, if an appreciable variation of velocity with depth does occur, it frequently becomes necessary to take into account the curving of the ray path in order to obtain more dependable interpretation of the seismic data with regard to the geologic structures being mapped.

This invention relates to a data plotter for plotting seismic velocity data when the velocity of the seismic waves is not constant but varies with depth in the strata being investigated.

It is an object of this invention to provide a seismic data plotter by means of which the position and dip of a reflecting interface may be plotted when the velocity of seismic waves vary with depth in the strata being investigated.

It is a further object of the invention to provide a seismic data plotter by means of which the maximum depth of penetration of a reflected ray may be plotted when the velocity of seismic waves varies with depth in the portion of the earth being investigated.

These and other objects of the invention will become more clear from the following description when read in conjunction with the accompanying drawings in which.

If seismic velocity can be approximated with sufficient accuracy as changing linearly with depth, then the velocity V at any point in the earth may be expressed as the sum of an initial velocity $V_0$ and the product of the depth Z by a constant K or, velocity $V = V_0 + KZ$.

With this velocity function it can be shown that, in two dimensions, the wave fronts are non-concentric circles with centers on a line in the direction of maximum velocity change. When the velocity increases linearly with depth, these centers will be on a line extending downwardly below the source of seismic disturbance. The ray paths are represented by a family of circles orthogonal to the wave front circles.

Figure 1:
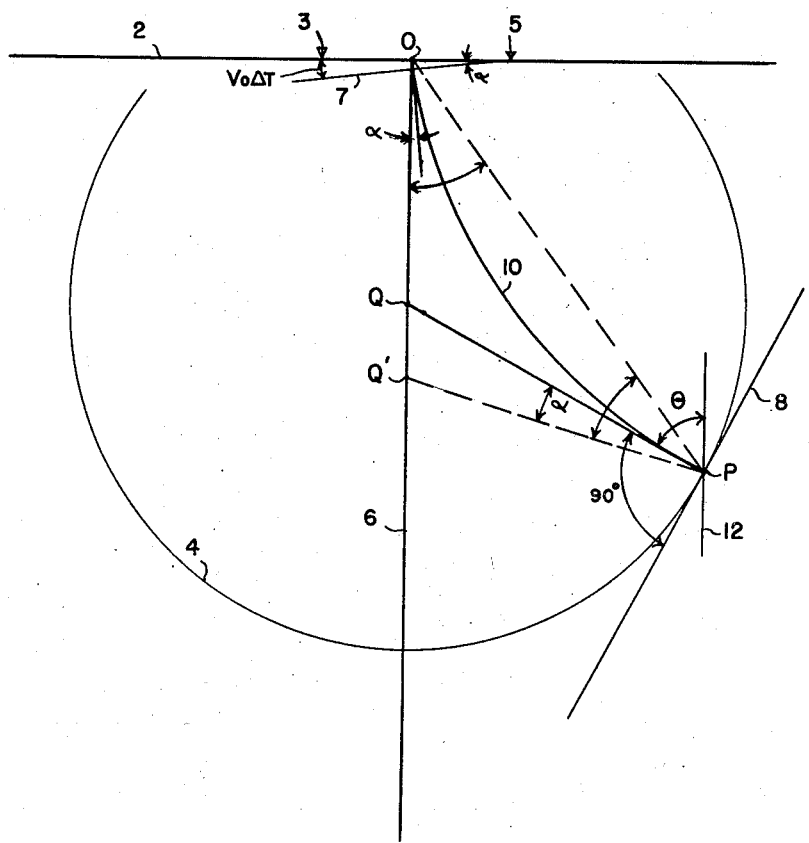
Figure 1 shows schematically a wave front and ray path diagram.

Referring to Figure 1 there is shown at 2 the surface of the earth on which at O there is located a shot point. A wave front 4 resulting from the shot at O has its center on the perpendicular line 6 extending downwardly from the shot point O. A reflecting interface 8 is shown tangent to the wave front 4 and contacting the wave front at point P. The reflecting interface 8 and the wave front 4 are perpendicular to the ray path which is indicated by the arc 10 extending between the point O and the point P.

In the procedure of seismic exploration, the sine of the angle of emergence, which is the angle of incidence of the ray path at the origin O and is indicated at $\alpha$ in Figure 1, is determined for a reflected or a refracted ray. At any point on a ray with the velocity equal to V, the angle between the tangent to the ray and the vertical line will be $\theta$. Then, for any point on the ray, $$\frac{\sin \theta}{V} = \frac{\sin \alpha}{V_0}$$

In the diagram of Figure 1 in which velocity increases downwardly and is equal to the velocity at the wave source plus a constant times the depth or $V = V_0 + KZ$, the line PQ which is tangent to the ray path at P passes through the instantaneous center Q of the wave front circle 4 on the line 6. OQ is the instantaneous distance from the origin to the center of the wave front circle. The angle $\theta$ is the angle between the tangent to the ray path and a vertical line 12. The angle $\theta$ is the same as the angle of dip of the reflecting interface 8, i. e., the angle of the reflecting interface 8 from a horizontal line, and also $\theta$ equals $180° - \angle OQP$.

With T equal to time, e equal to base of Napierian logarithms and other terms as have been defined, the distances OQ and OP may be expressed in terms of time.

$$OQ = \frac{V_0}{K}\left(\cosh \frac{KT}{2} - 1\right)$$

$$QP = \frac{V_0}{K}\left(\sinh \frac{KT}{2}\right)$$

$$\tan \frac{\theta}{2} = e\left(\frac{KT}{2}\right) \tan \frac{\alpha}{2}$$

From these expressions, the angle of the reflecting interface 8 and the location of point P may be determined for any given value of T, $V_0$, and K. If time scales are constructed to measure OQ and QP, and the $\angle OQP = 180° - \angle \theta$ is measured from OQ, the point P may be readily found, and since the interface 8 is perpendicular to QP, a trace of a portion of the reflecting interface may be plotted.

In Figure 1 the point Q' on line 6 is located so that $OQ' = PQ'$. Thus, $\angle Q'OP = \angle Q'PO$. Then $\angle QPQ' = \angle \alpha$ and $\angle OPQ' - \angle QPQ' = \angle QOP' = \angle \theta$.

By the use of the data plotter which will be described, the location of point P and the location and angle of dip of the interface 8 may be determined mechanically from a knowledge of the sin α and the total reflection time T which will be read on appropriately constructed time scales. With the ∠OPQ' determined and by using the time scales to find distances OQ and PQ, the angle θ which is ∠OPQ' − ∠α = ∠QOP can be immediately determined.

The data plotter mechanism required to determine the ∠OPQ' and the ∠OPQ' − ∠α = ∠QOP = ∠θ together with the correct position of P will involve two time scales for measuring distances OQ and QP as previously noted, and linkages to obtain relative rotation and translation necessary to keep ∠OPQ' = ∠Q'OP, to determine ∠θ and to locate P accurately with respect to the origin O.

Figure 2:
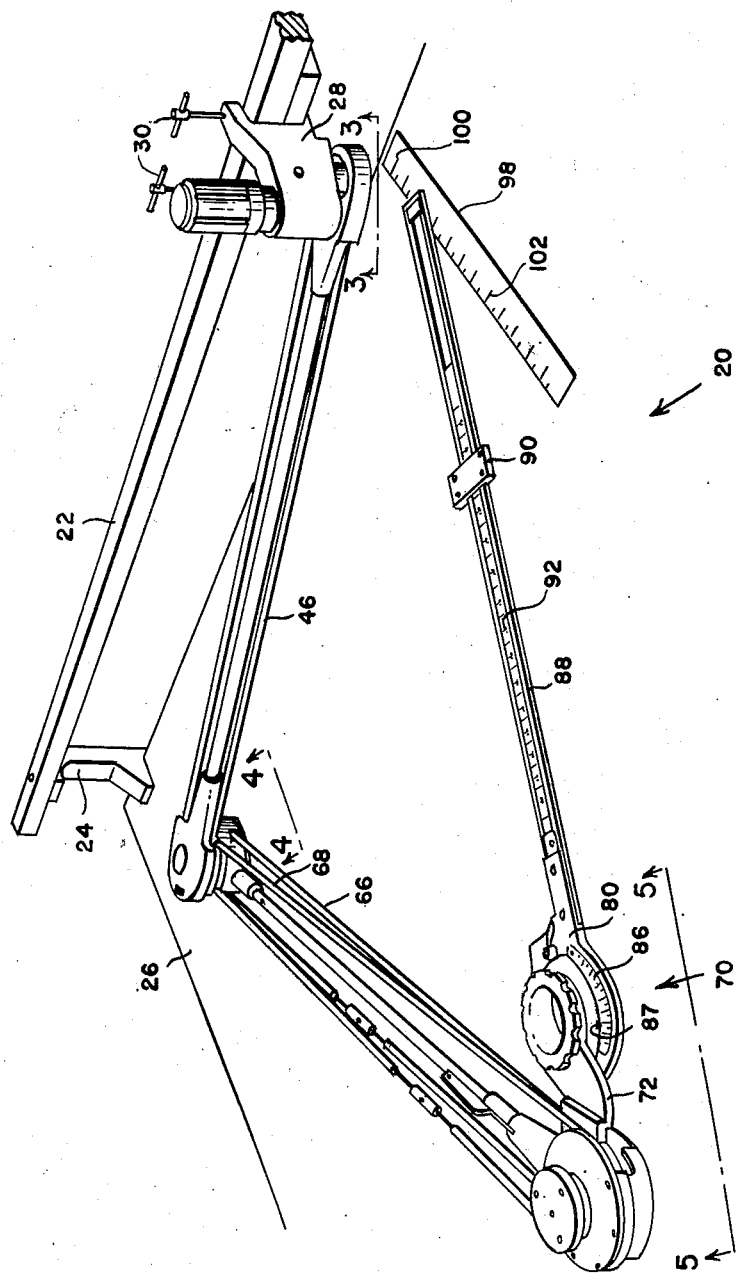
Figure 2 is a perspective view of the data plotter.

Referring to Figure 2 there is shown generally at 20 data plotting mechanism involving the foregoing considerations. A horizontally extending bar 22 is mounted on brackets 24 attached to and extending upwardly from the surface of a table 26. The data plotter mechanism is attached to the bar 22 by means of an anchor bracket 28 and clamping screws 30. The clamping bracket 28 and the bar 22 provides an arrangement whereby the data plotter 20 may be positioned selectively with respect to the surface of the table 26.

Figure 3:
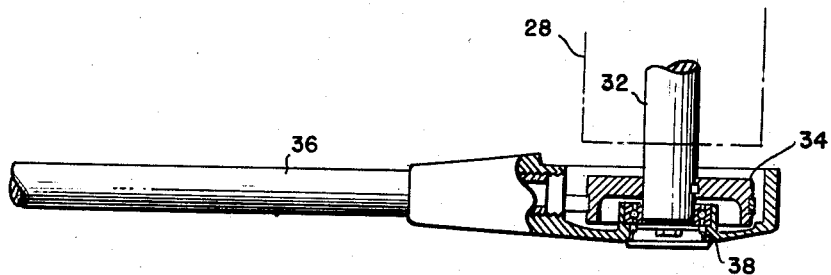
Figure 3 is a partially cut away portion of the plotter indicated at 3—3 in Figure 2.
Figure 4:
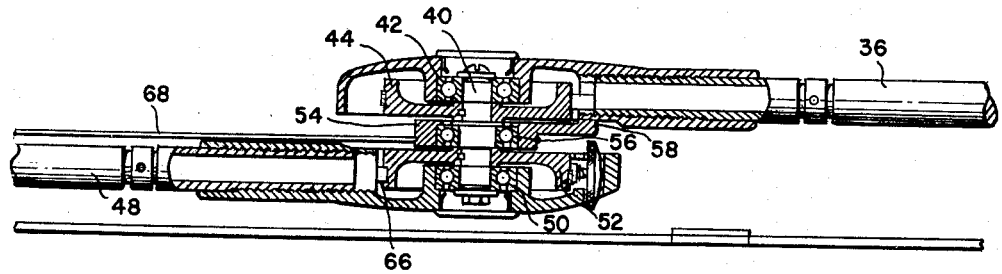
Figure 4 is a partially cut away portion of the plotter indicated at 4—4 in Figure 2.
Figure 5:
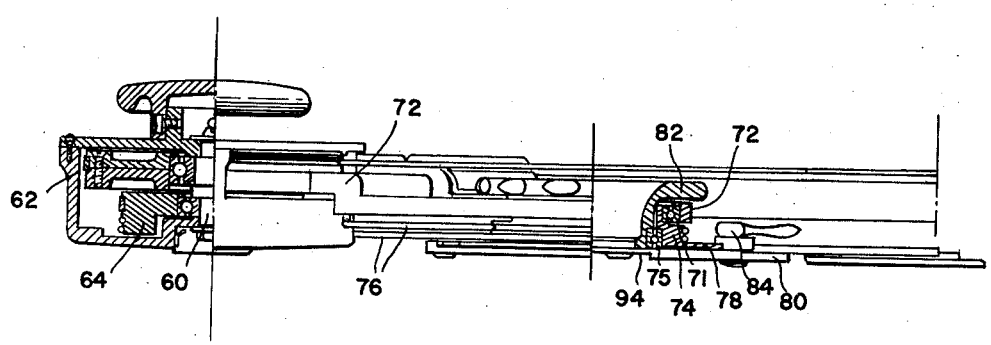
Figure 5 is a partially cut away portion of the plotter indicated at 5—5 in Figure 2.

The plotter mechanism which is shown in detail in Figures 3, 4 and 5 includes a shaft 32 fixed in the mounting bracket 28 and extending downwardly therefrom. A pulley 34 is fixed to the shaft 32. One end of an arm 36 is rotatably mounted on the shaft 32 by means of a bearing 38.

A shaft 40 is rotatably mounted in the opposite end of the arm 36 by means of a bearing 42. A pulley 44 is fixed to the shaft 40. An endless belt 46 extends around the pulleys 34 and 44.

One end of a second arm 48 is rotatably mounted on the shaft 40 by means of a bearing 50. A pulley 52 is fixed to the shaft 40. A pulley 54 is rotatably mounted on the shaft 40 by means of a bearing 56 and is fixed with respect to the arm 36 by means of an extension 58 which is attached thereto.

In the opposite end of the arm 48 there is mounted a shaft 60. Rotatably mounted on the shaft 60 is a pair of pulleys 62 and 64. An endless belt 68 connects the pulley 54 with the pulley 62 and an endless belt 66 connects the pulley 52 to the pulley 64.

The diameter of the pulley 34 is equal to the diameter of the pulley 44 and the diameter of the pulley 52 is equal to the diameter of the pulley 64. The length of the arm 36 between the centers of shafts 32 and 40 is equal to the length of the arm 48 between the centers of shafts 40 and 60. The diameter of the pulley 54 is one-half the diameter of the pulley 62.

A plotting head, indicated generally at 70 in Figure 2, is mounted on a plotting head plate 72 which is fixed to the pulley 62. A pulley 74 is rotatably mounted in the plate 72 on a bearing 71 and is connected to the pulley 64 by means of a crossed belt arrangement 76 so that rotation of the pulley 64 in one direction will cause rotation of the pulley 74 in the opposite direction. The diameter of the pulley 74 is equal to that of the pulley 64.

It will be evident that, with the belts tight to prevent slippage, a point on pulley 62 lying on the line determined by the centers of shafts 32 and 60, will continue on this line for all positions of the shaft 60 resulting from rotation of the device about either or both the shafts 32 and 40. Geometrically, the cord line OP shown in Figure 1 will be on this line. It follows that the axes of pulleys 34, 74 and 64 are coplanar for any position of the plotter and as the plate 72 undergoes rotation about the center of pulley 34, the pulleys 74 and 64 rotate in opposite directions about their respective centers in the plate 72.

As previously noted, the pulley 74 is rotatably mounted in the plate 72. A radially extending flange 78 extends from the lower face of the pulley 74 as viewed in Figure 5. A plate 80 is fixed to the lower surface of a cup-shaped member 82 which is rotatably mounted within the pulley 74 by means of a bearing 75. A friction lock clamping device 84 is attached to the plate 80 and serves to clamp the plate 80 into fixed relation with the flange 78 of the pulley 74. The plate 80, a cup-shaped member 82 and a plate 94 attached to the plate 80 form the plotting head.

A circular plate 86 is fixed to the plate 80 and is calibrated in terms of the sine of the angle of displacement between the pulley 74 and the plate 80. An arm 88 is fixed to the member 80 and thus is rotatable about the center of the pulley 74. A slider 90 is mounted on an arm 88 and is settable thereon with regard to the time scale calibrations 92 on the arm 88 which will be hereinafter described.

A plate 94 is inserted in a bore within the plate 80 in the vicinity thereof within the lower portion of the cup 82. The plate 94 is provided with axially aligned pairs of transversely extending slots positioned at right angles to each other as indicated at 96. One of these pairs of slots is in alignment with an indicating pointer 87 by means of which the scale 86 is read and the other of the slots is at right angles thereto and axially parallel to the arm 88. As will be hereinafter described, the point of crossing of the slots 96 is indicative of the point P on an interface 8 when the plotter is properly positioned.

A time scale 98 bearing time scale calibrations 102 is positioned on the table 26 with its zero point, indicated at 100, positioned immediately below the center of the shaft 32 in the anchor bracket 28.

It can be shown that the scale of calibration of the time scale 92 may be drawn by using the expression $$T = \frac{2}{K} \sinh^{-1}\left(\frac{R'K}{V_0}\right)$$

Similarly, the time scale 102 may be drawn by using the expression $$T = \frac{2}{K} \cosh^{-1}\left(\frac{Z'K - 1}{V_0}\right)$$

These expressions may be derived mathematically or by a graphical procedure and are in terms of total reflection time. It is believed unnecessary, however, to burden this disclosure with a derivation of these expressions. It is sufficient to note that for the use of the plotter, the time scales are derived in accordance with those expressions.

With a point on pulley 62 lying on the line determined by the centers of shafts 32 and 60 for all positions of the shaft 60 and with the axes of the pulleys 34, 72 and 62 coplanar at all times, and assuming the instrument is in adjustment with the plotting head locked with the scale 86 set at zero with respect to the pointer 87, then for any position of the shaft 60, that is, for any position of P the center of the crossed slots in the plotting head 70, the scale slider 90 will be on a line equivalent to the line PQ' of Figure 1. Rotation of the plotting head 70 with regard to the plate 72 displaces the time scale 92 and this angle of displacement, as indicated at the pointer 87, is made to equal the ∠α referred to in connection with Figure 1. This rotation of the plotting head 70 is such that the ∠QOP is made equal to the ∠Q'PO. As previously described, the ∠θ, the angle between the ray path at P and the vertical, will then always be ∠OPQ' − ∠α = ∠QOP.

The time scales 92 and 102 as previously noted are calibrated in terms of total reflection time. The scale 102 is fixed to the table and measures time vertically downwardly from the point of origin O, indicated in Figure 6, to the point Q. The distance Z' represents the depth of the center of the wave front circle at P. The scale 92 on the plotting arm 88 increases from T=0 at P toward Q. This distance R' represents the radius of the wave front circle corresponding to the center at depth Z'. The scale rider 90 on the plotting arm 88 is used to match the readings on scales 102 and 92.

In the use of the plotter, the constants $V_0$ and $K$ must be determined for use in the formula $V=V_0+KZ$. These constants may be obtained from a velocity-depth graph applicable to the area under investigation. $K$ will be the slope of the line and $V_0$ will be the $V$-intercept. In Figure 1 the reflected wave section indicated at 7 received by detectors 3 and 5 is shown as a straight line forming an $\angle \alpha$ with the horizontal surface 2 of the earth in which the detectors are located. While in actual practice the wave front would be spherical (or in two dimensions circular), the depth to the reflecting interface is usually so much greater than the distance between the detectors that the segment of the reflected wave intercepted by the detectors can be considered to be a straight line. If the shot point is midway between the detectors, we then have the expression $$\sin \alpha = \frac{V_0 \Delta T}{\Delta X}$$

in which $\Delta X$ equals the distance between detectors; $V_0$ equals seismic velocity at the surface of the earth; $\Delta T$ equals difference in arrival time at the two detectors.

From the field record, the reflection time is obtained for the two detectors, one on each side of the shot point and each equal distances from the shot point. If these times are represented as $t_1$ and $t_2$ the difference between these times divided by the surface velocity and the distance between detectors gives the sine of the angle of emergence. Thus $$\sin \alpha = \frac{t_1 - t_2}{V_0 \Delta T}$$

The average of the two reflecting times $t_1$ and $t_2$ is used for setting the reflection times on the scales 92 and 102. Thus, on these scales $$T = \frac{t_1 + t_2}{2}$$

To position the plotter, the plotting head, comprising parts 80, 82 and 94, is rotated so that the pointer 87 is displaced from the zero displacement position on the scale 86 by an angle equal to $\angle \alpha$. The slider 90 is then set with its index on the value of $T$ on the scale 92. With the plotting head and the index slider 90 fixed in these positions, the plotting head mounting plate 72 is then moved to move the plotter assembly so that the index point of the slider 90 will coincide with the value of $T$ on the scale 102. It should be noted that, if $t$ for the right-hand detector 5 is smaller than $t$ for the left-hand detector 3, the arm 88 should be turned to the right with respect to the plotting head, whereas if $t$ for the left-hand detector is smaller than $t$ for the right-hand detector, the arm 88 should be turned to the left with respect to the plotting head. When the plotter has been set with the plotting head and the arm 88 rotated from their zero position by an angle equal to the $\angle \alpha$ and the two time scales are located with their time values $T$ coincidentally positioned, a portion of the reflecting interface may then be plotted through the slots 96 in the plotting head extending perpendicular to the arm 88 and the point $P$ may be marked at the center of rotation of the plotting head.

Thus the seismic data plotter provides apparatus for determining the location and dip of a reflecting strata and takes into account the increase of velocity of seismic waves with depth in the earth which makes the consideration of curved ray paths necessary. With well constructed apparatus having essentially no free motion in the plotting arms, the mechanical accuracy of the plotter is equivalent to and probably better than the accuracy of the field data obtained in reflection shooting.

The apparatus may also be employed to find the maximum depth of penetration of a refracted ray in weathering correction studies when the seismic velocity through the earth is $V=V_0+KZ$. In the use of the apparatus for this purpose time scales are prepared showing one-way time instead of reflection time. A much larger scale of plotting would be employed than for plotting deep reflections. The procedure is to plot, to scale, the position of an explosive charge in a shot hole and the position of a detector generally located at or adjacent to the surface of the earth. The data required in the use of the apparatus is the seismic velocity through the earth at the detector, the rate of velocity increase with depth in the earth, the depth of the shot point, the horizontal distance between the shot point and the detector, and the travel time of the seismic wave between the shot point and the detector.

Figure 6:
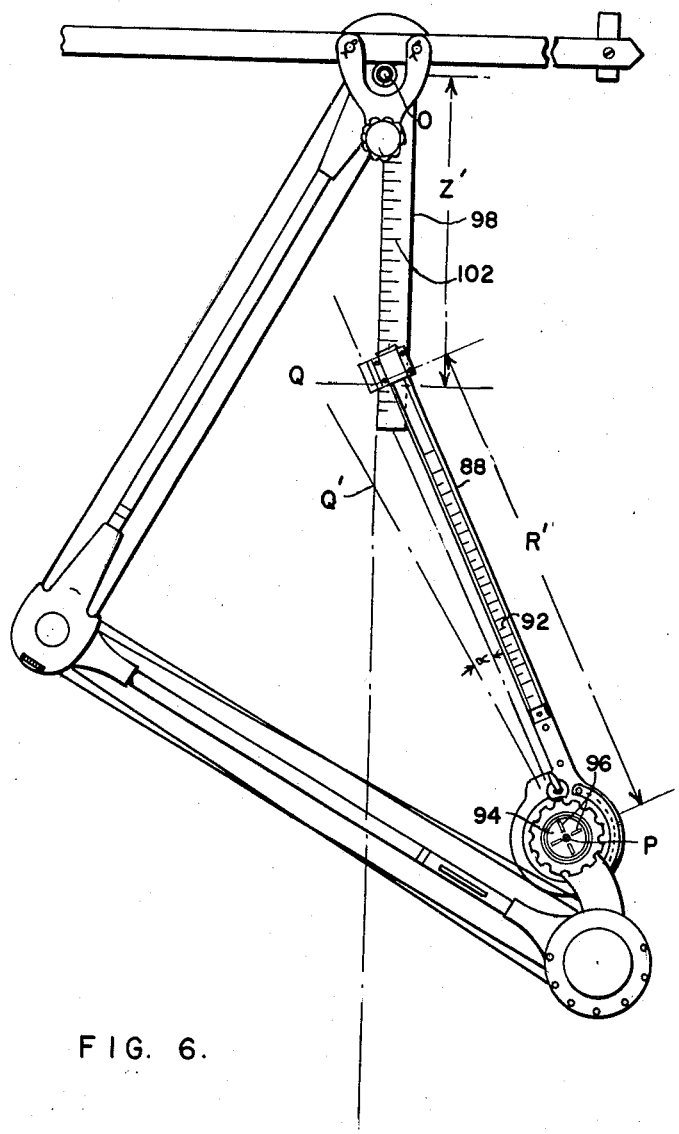
Figure 6 is a plan view of the plotter.

Having this information, the zero point O, of the scale 98 as shown in Figure 6, is placed over the detector location. With the plotting arm 88 released so that it is free to rotate about the plotting head, the center of the plotting head, P in Figure 6, is placed over the shot point and the plotting arm 88 is rotated to obtain coincidence of the same time point on the two time scales 92 and 102. When this coincidence is obtained, the plotting arm is locked to the plotting head. The reading on the scale 86 will be the sine of the emergence angle at the detector.

From Snell's law the ratio of the sine of the angle of incidence $\theta$ to the velocity is a constant for each refracted ray or $$\frac{\sin \theta_1}{V_1} = \frac{\sin \theta_2}{V_2} = \frac{\sin \alpha}{V_0}$$

The sine $\theta$ for the refracted ray at maximum depth is 1 since, here $$\theta = \frac{\pi}{2}$$

Since the velocity increases with depth, this will be the point of maximum velocity or $V_m$. Then $$\frac{\sin \alpha}{V_0} = \frac{\sin \frac{\pi}{2}}{V_m} = \frac{1}{V_m}$$

$$V_m = \frac{V_0}{\sin \alpha}$$

But $$V = V_0 + Kz$$

$$z = \frac{V - V_0}{K}$$

and the depth of maximum penetration $$z_m = \frac{V_m - V_0}{K}$$

$$= \frac{\frac{V_0}{\sin \alpha} - V_0}{K} = \frac{V_0}{K}\left(\frac{1}{\sin \alpha} - 1\right)$$

It is seen from the above that both the maximum depth and the maximum velocity of any refracted ray can be easily determined.

The data plotter may also be used for plotting reflections when the velocity is constant with depth. For this purpose the scale 98 is not used and the scale 88 is marked with total reflection times for the relationship $$t = \frac{2s}{V}$$

in which $t$ is the total reflection time, $V$ is the velocity and $s$ is the one-way distance from the shot point to the reflecting interface. Sin $\alpha$ is used in the same manner as when plotting reflections with curved ray paths. The index of slider 90 is made to coincide with the zero point O.

What is claimed is:

1. A seismic data plotter comprising a plotting head, means mounting said plotting head for rotation of its center around a fixed reference point in arcs of variable radius with a point on the plotting head displaced from its center being for all positions of the plotting head on a line extending between said fixed reference point and said plotting head center, means providing a seismic time scale extending outwardly from said plotting head and having a zero point coincident with said center of the plotting head, and means providing for rotation between said plotting head and said time scale around said center of said plotting head.

2. A seismic data plotter comprising means providing a first seismic time scale having a zero point and adapted to be fixed in a position representative of a vertical direction in the earth, a plotting head, means mounting said plotting head for rotation of its center around said zero point in arcs of variable radius with a point on the plotting head displaced from its center being for all positions of the plotting head on a line extending between said zero point and said plotting head center, means providing a second seismic time scale extending outwardly from said plotting head and having a zero point coincident with said center of the plotting head, and means providing for rotation between said plotting head and said time scale around said center of said plotting head.

3. A seismic data plotter for plotting the location and dip of a reflecting interface comprising means providing a seismic time scale with the zero point of the scale representative of the point of origin of a seismic disturbance, a plotting head including means for indicating the location and dip of a reflecting interface, means mounting said plotting head for rotation of its center around said point of origin in arcs of variable radius, means providing a second seismic time scale extending outwardly from said plotting head with the zero point of the scale coincident with the center of said plotting head, and means providing for rotation between said plotting head and said second time scale.

4. A seismic data plotter for plotting the location and dip of a reflecting interface comprising means providing a seismic time scale with the zero point of the scale representative of the point of origin of a seismic disturbance, said time scale extending perpendicular to a line representative of the surface of the earth, a plotting head including means for indicating the location and dip of a reflecting interface, means mounting said plotting head for rotation of its center around said point of origin in arcs of variable radius, a second seismic time scale extending outwardly from said plotting head with the zero point of the scale coincident with the center of said plotting head, and means providing for rotation between said plotting head and said second time scale.

5. A seismic data plotter for plotting the location and dip of a reflecting interface comprising means providing a seismic time scale with the zero point of the scale representative of the point of origin of a seismic disturbance, a plotting head including means for indicating the location and dip of a reflecting interface, means mounting said plotting head for rotation of its center around said point of origin in arcs of variable radius with a point on the plotting head displaced from its center being for all positions of the plotting head on a line extending between said point of origin and said plotting head center, a second seismic time scale extending outwardly from said plotting head with the zero point of the scale coincident with the center of said plotting head, and means providing for rotation between said plotting head and said second time scale.

6. A seismic data plotter for plotting the location and dip of a reflecting interface comprising means providing a seismic time scale with the zero point of the scale representative of the point of origin of a seismic disturbance, said time scale extending perpendicular to a line representative of the surface of the earth, a plotting head including means for indicating the location and dip of a reflecting interface, means mounting said plotting head for rotation of its center around said point of origin in arcs of variable radius with a point on the plotting head displaced from its center being for all positions of the plotting head on a line extending between said point of origin and said plotting head center, a second seismic time scale extending outwardly from said plotting head with the zero point of the scale coincident with the center of said plotting head, and means providing for rotation between said plotting head and said second time scale and a calibrated scale for indicating the degree of rotation therebetween.

7. A seismic data plotter for plotting the location and dip of a reflecting interface comprising means providing a seismic time scale with the zero point of the scale representative of the point of origin of a seismic disturbance, said time scale extending perpendicular to a line representative of the surface of the earth, a plotting head including means for indicating the location and dip of a reflecting interface, means mounting said plotting head for rotation of its center around said point of origin in arcs of variable radius, a second seismic time scale extending outwardly from said plotting head with the zero point of the scale coincident with the center of said plotting head, and means providing for rotation between said plotting head and said second time scale, said time scales and said mounting means being constructed and arranged to position the center of rotation between said second time scale and said plotting head over the point of tangency of a reflecting interface and a wave front circle when said time scales are positioned with time values thereon equal to the reflecting time from said interface in superimposed relation and said second time scale and said plotting head are displaced by an angle equal to the angle of emergence of said wave from said first mentioned scale at the zero point thereof.

8. A seismic data plotter for plotting the location and dip of a reflecting interface comprising means providing a seismic time scale with the zero point of the scale representative of the point of origin of a seismic disturbance, said time scale extending perpendicular to a line representative of the surface of the earth, a plotting head including means for indicating the location and dip of a reflecting interface, means mounting said plotting head for rotation of its center around said point of origin in arcs of variable radius with a point on the plotting head displaced from its center being for all positions of the plotting head on a line extending between said point of origin and said plotting head center, a second seismic time scale extending outwardly from said plotting head with the zero point of the scale coincident with the center of said plotting head, and means providing for rotation between said plotting head and said second time scale, said time scales and said mounting means being constructed and arranged to position the center of rotation between said second time scale and said plotting head over the point of tangency of a reflecting interface and a wave front circle when said time scales are positioned with time values thereon equal to the reflecting time from said interface in superimposed relation and said second time scale and said plotting head are displaced by an angle equal to the angle of emergence of said wave from said first mentioned scale at the zero point thereof.

9. A seismic data plotter for plotting the location and dip of a reflecting interface comprising means providing a seismic time scale with the zero point of the scale representative of the point of origin of a seismic disturbance, a plotting head including means for indicating the location and dip of a reflecting interface, means mounting said plotting head, said mounting means comprising translating means including a first arm having an end pivoted over the zero point of said first time scale, a second arm having one end pivoted to the other end of said first arm, a plotting head mounting member pivotally mounted to the other end of said second arm and rotatably mounting said plotting head, and means including said arms for rotating said plotting head around said point of origin in arcs of variable radius with a point on the plotting head displaced from its center being for all positions of the plotting head on a line extending between said point of origin and said plotting head center, a second seismic time scale extending outwardly from said plotting head with the zero point of the scale coincident with the center of said plotting head, and means providing for rotation between said plotting head and said second time scale.

References Cited in the file of this patent

UNITED STATES PATENTS

| | | |
|---|---|---|
| 2,364,153 | MacLeod | Dec. 5, 1944 |
| 2,460,642 | Knauth | Feb. 1, 1949 |
| 2,463,788 | McGuckin | Mar. 8, 1949 |
| 2,535,220 | McGuckin | Dec. 26, 1950 |